_United States Patent_ [19]

Sowers

[11] 4,420,542

[45] Dec. 13, 1983

[54] ARTICLE AND METHOD FOR WOOD PRESERVATION

[75] Inventor: Edward E. Sowers, Mooresville, Ind.

[73] Assignee: Reilly Tar & Chemical Corp., Indianapolis, Ind.

[21] Appl. No.: 436,573

[22] Filed: Oct. 25, 1982

[51] Int. Cl.³ .................... B32B 23/08; B05D 3/02
[52] U.S. Cl. .................................. 428/541; 427/393; 427/440
[58] Field of Search ............... 428/511, 541; 427/393, 427/440

[56] References Cited

U.S. PATENT DOCUMENTS 1,766,606  6/1930  Coolidge ........................... 428/541
3,968,318  7/1976  Betty ................................. 428/511
4,143,188  3/1979  Huber-Nuesch ............... 427/393 X _Primary Examiner_—George F. Lesmes
_Assistant Examiner_—Nancy A. B. Swisher
_Attorney, Agent, or Firm_—Woodard, Weikart, Emhardt & Naughton

[57] ABSTRACT

An article and method for treating wood to promote preservation and inhibit fungi and bacteria attack, comprising the wood treated with a polymer with pendant groups containing pyridine rings complexed with copper. Treatment can include impregnating the wood through pressure, vacuum, soaking or other means or more superficial applications to the wood surface through brushing, painting, dipping or the like. Preferred are one-step and two-step procedures with poly-4-vinylpyridine as the polymer of choice and copper chloride or copper sulfate as the preferred copper ion source. Treatment can be with the monomer or homopolymer form, followed by polymerization and/or cross-linking in situ in the wood after application.

45 Claims, No Drawings

ARTICLE AND METHOD FOR WOOD PRESERVATION

BACKGROUND OF THE INVENTION

This invention relates generally to the development of biocides used in wood preservation, and more particularly to the discovery that a polymer with pendant groups containing pyridine rings complexed with copper is effective as a treatment for wood for preservation purposes.

The history of man's efforts at wood preservation is a long one, dating back several thousands of years to the first coating of wood with oils to increase its durability. Ironically, the principal methods and materials employed by the wood preservation industry have changed relatively slowly over the years. For example, the major biocidal preservatives in use today are creosote, pentachlorophenol and chromated copper arsenates (CCAs), which were patented in 1834, the late 1920's and 1933, respectively. Moreover, with pressure treating of wood products still being the most practiced technique, it is interesting that common pressure processes still in use today, such as the full-cell process and the Lowry empty-cell process, were patented between 1838 and 1906.

Looking more carefully for the moment at the wood-attacking fungi and bacteria themselves, hundreds of different species have been isolated over the years which attack wood products in one of many ways. These effects range from complete destruction to deep or surface staining and even to no apparent effect in certain instances. Typical varietal classes for the wood-attacking fungi include surface molds, sap stain fungi, decay fungi, soft-rot fungi and others. Typical wood-attacking bacteria include *Sarcina lutea, Pseudomonas nigrifaciens,* and other soil and marine bacteria. Disregarding their many differences, all have in common five basic requirements to survive, those being the need for food, oxygen (in some cases), moisture, warmth and a suitable pH. Nonbiocidal techniques, designed to control these organisms by modifying or eliminating any one of these environmental requirements, are available and have met with degrees of success under certain circumstances. However, biocidal wood preservatives have been long regarded as the most effective and commonly used control method.

Research directed to the formulation of new biocides for fungicidal and bacteriacidal uses is a long and arduous task. Added to the normal costs of research and development must be the stringent requirements of governmental controls, considerations of the environment, the universal roles these substances must fill, and the like. For example, a listing of suggested requirements for an effective wood preservative formulation would need to include: (1) that it be toxic to wood-attacking fungi and bacteria, and possibly also to a wide variety of insects such as termites, Lyctide, Anobiid, and Cerambycide beetles; (2) that it has sufficient permanence to provide an acceptable useful life for the wood; (3) that it have little, if any, effect on the strength or other properties of the wood; (4) that it provide good penetration into the wood depending on the method of application used; (5) that it be readily available and relatively inexpensive and easy to apply; and (6) that the wood after treatment be safe to handle, nontoxic to other animal and plant life, noncorrosive to fastening means or other materials which contact it, and at least for certain applications be paintable, odorless, colorless, water-repellant, compatible with various adhesives and like considerations.

As for the types of biocides now used for wood preservation, these typically fall within two categories . . . oil-borne preservatives (of which pentachlorophenol and distillates of coal tar such as creosotes are most common) and water-borne preservatives (of which copper-containing inorganic salt-type biocides such as acid copper chromate (ACC), chromated copper arsenate (CCA) and ammoniacal copper aresenate (ACA) are common examples). For a listing of other known biocides, and particularly fungicides, and for a good general discussion of the entire wood preservation industry, reference can be made to M. P. Levi, "Fungicides in Wood Preservation," *Antifungal Compounds,* Vol. 1, edited by M. R. Siegel and H. D. Sisler, Marcel Decker, Inc., 397–436 (1977).

Although the primary concern in wood preservation is prevention of decay, control of surface mold growth and other more superficial considerations are also of importance, particularly in a given environment. The mode of action of biocides on the market and their effectiveness in dealing with wood-attacking fungi and bacteria in a given situation is often tied to the method of application used. In this regard, long thought to be most reliable for commercial preservation purposes has been pressure treatment techniques particularly when seasoned wood is involved. Vacuum treatments, hot and cold bath or thermal treatments, cold-soak treatments and more superficial treatments such as brushing, spraying, dipping or short-soak methods are also practiced with seasoned woods. Diffusion treatments, sap displacements and similar superficial treatments are most common when unseasoned wood is involved. The article by M. P. Levi mentioned above provides good discussion of these application methods including their advantages and disadvantages under particular circumstances.

In the past two-to-three-year period, a few publications have addressed the possible biocidal properties of specific polymeric compounds. These have consisted of certain polymeric quaternary salts [I. H. Walfish and G. E. Janauer, *Water, Air and Soil Pollution,* 12, 477 (1979)] and polymers that contain halogens such as iodine [L. R. Fina, *Ind. Eng. Chem. Prod. Res. Dev.,* 19, 259 (1980)]. Their suggested uses have principally been to control bacteria in water. In only one instance known to applicant has a polymer been reported as having possible use in wood preservation [Charles E. Carraher, Jr. and Charles G. Gebelein, *Biological Activities of Polymers,* 28–33 (1982)]. The polymers tested were two organometallic polymers which had been previously developed, tributyltin methacrylate/methyl methacrylate copolymer and the tributyltin ester of methyl vinyl ether/maleic anhydride.

SUMMARY OF THE INVENTION

It has now been discovered by applicant that a polymer with pendant groups containing pyridine rings complexed with copper is effective as a treatment for wood for preservation purposes. In particular, articles of wood treated with applicant's polymeric copper complex have been shown to be significantly resistant to wood loss or decay due to fungi or bacteria attack, magnitudes better than untreated wood and at least as good as wood treated with the long-used creosote compounds and pentachlorophenol. As a method for preservation, treating wood with applicant's polymeric copper complex is simple, susceptible to many treating techniques, and is an effective and efficient preventer of fungi and bacteria growth and decay. Unlike creosotes, wood treated with applicant's polymeric copper complex is also susceptible to subsequent application of paints or other surface coatings.

In preferred modes of these embodiments, applicant's polymeric copper complex has proven effective whether in cross-linked or homopolymer form in the wood. Poly-4-vinylpyridine has been preferred, although grafts and copolymers of 4-vinylpyridine monomer as well as other polymers entirely have worked and are suitable for given applications so long as pyridine rings are present to complex with the copper. A full range of treating methods are available, from impregnating the wood through soaking, pressure or vacuum techniques to more superficial applications through brushing, spraying, dipping and the like. Preferred for most applications has been a one-step method involving treating the wood with an aqueous methanolic solution of a soluble complex of poly-4-vinylpyridine with a copper salt such as copper chloride. An alternate two-step method has been to first apply the polymer in solution to the wood followed by a second application of an aqueous copper solution which complexes with the available pyridine rings in pendant groups to the polymer chains.

Preferences as to concentration and other reaction conditions vary as with the method of application, desired end use, and other factors discussed later in the application. In this context, and for the remainder of the specification and claims, concentration percentages for a component in solution are given as percents by weight, calculated as the number of parts by weight of the component divided by the number of parts of weight of the solution.

Related objects and advantages of the present invention will be apparent from the following description.

DESCRIPTION OF THE PREFERRED EMBODIMENT

For the purposes of promoting an understanding of the principles of the invention, reference will now be made to the several embodiments and specific language will be used to describe the same. It will nevertheless be understood that no limitation of the scope of the invention is thereby intended, such alterations and further modifications and applications of the principles of the invention as described herein being contemplated as would normally occur to one skilled in the art to which the invention relates.

Referring now to one aspect of applicant's invention, articles of wood have been treated with applicant's polymer having pendant groups containing pyridine rings complexed with copper, and the very nature and character of the wood's resistance to fungicidal and bacteriacidal attack and decay have been significantly improved. This was true whether the polymeric copper complex in the final article was in cross-linked or homopolymer form, the choice of which depends upon the solubility restrictions of the environment in which the article is later used. For example, both forms are insoluble in water, whereas the cross-linked polymeric copper complex is further insoluble in a broader range of conventional solvents.

The term "homopolymer" as used in this application identifies polymeric forms other than a cross-linked structure, therefore encompassing both the linear and branched forms. The term "preservation" and its variations are used in their broadest, generic meanings to encompass uses of applicant's invention to combat all forms and effects of fungi and bacteria attack such as those described in the background section of the application. The term "effective" as used herein in the context of an effective number or amount of pendant groups or pyridine rings, or an effective polymeric copper complex or treatment for wood, refers to the fact that applicant's polymer need only have enough copper and available pyridine rings to provide a sufficient amount of complexing to be effective for the particular biocidal and preservation purposes intended. The precise concentration, dilution or degree of this complex or its components is not essential to the invention in its broader aspects, and will be within the knowledge and ability of those skilled in practicing this art.

On this point of what is effective, there is no known threshhold, or lower or upper limit on the depth, degree or amount of treatment of a wood article with applicant's polymeric copper complex. Preferences for these parameters instead vary, as do other conventional reaction conditions such as temperature, pressure and time, depending upon factors such as the specific method of treating used, whether the wood is seasoned or unseasoned, the environment for which use is proposed, and other considerations. Moreover, no restrictions are known on the concentration or amount of either the copper or the polymer components of the preservative in the final article, other than those limitations that would occur to any person skilled in the art based on factors such as end use and the like. Once applied, however, articles of wood treated with embodiments of applicant's polymeric copper complex have shown significant resistance to weight loss and decay due to fungi and bacteria attack at least as effective as cresotes, pentachlorophenol, and other compounds which have been tested.

Now referring to the method aspect of the invention, the procedure for treating wood with applicant's polymer having pendant groups containing pyridine rings complexed with copper has proven a simple and effective procedure for preserving and protecting wood against deterioration by wood-attacking organisms. Several preferred techniques have been used for accomplishing this treating step, depending upon factors such as the environment and end use for the particular wood article and the specific result desired.

For example, if the wood article will be exposed to the ground or other harsh environmental conditions with a high degree of susceptibility to attack by wood-attacking organisms, the depth, degree and amount of penetration and retention of the polymeric copper complex become major concerns. Under these circumstances, as for example with wood posts, poles or timbers, a preferred treating technique is forcibly impregnating the wood with applicant's polymeric copper complex using any one of a number of procedures common and known in the industry. Pressure impregnation is most common and reliable of these techniques, as with the pressure-treating of timbers with creosotes and similar compounds for in-ground use. Other conventional techniques suitable for impregnating wood with applicant's polymeric copper complex include use of vacuums, hot or cold baths, or soaking, all of which are designed to achieve higher degrees of penetration and retention of the polymeric copper complex.

At the other extreme are situations where more superficial treating techniques are acceptable, as with treating the eave on a house or some other wood surface not continuously subjected to a hostile environment. Under these circumstances, a preferred treating technique is a more superficial applying of the polymeric copper complex to the surface of the wood being protected, as for example by brushing, spraying and other conventional painting procedures.

In all of these treating procedures, whether penetration and retention are of concern or whether a more superficial application is satisfactory, applicant has preferred either a one-step or a two-step method for applying his polymeric copper complex. Referring first to the two-step method, the wood was first treated with a solution of applicant's preferred polymer which contained sufficient pendant groups with pyridine rings, or radicals, to be effective in accomplishing the purpose or degree of preservation desired. An alcohol such as methanol is the solvent of choice thus far, although also suitable are ethylene glycol, pyridine, 1-formylpiperidine, acetic acid and others, or mixtures thereof. Poly-4-vinylpyridine is the polymer of choice thus far, although copolymers such as 4-vinylpyridine with styrene or other monomers as well as other polymers entirely such as poly-2-vinylpyridine, poly-2-methyl-5-vinylpyridine and others are also suitable depending upon the availability of pyridine rings to be complexed with the copper ions to satisfy the proposed end use. Successful use was also made of such polymers in a partially quaternized form, as for example the result of a conventional quaternization procedure such as disclosed in Jpn. Kokai Tokkyo Koho No. 79,157,828, Shigematsu, Taichiro; Shibaura, Tetsuya; Naka, Tetsu; Teraoka, Toru; Mitsubishi Chemical Industries Company, Ltd. Still other experiments have shown that a radical-induced graft polymerization method produced satisfactory results where, for example, 4-vinylpyridine monomer was grafted directly onto the cellulose fibers of the wood to form the polymer chains which were subsequently complexed with the copper ions. For these reasons, no single polymer compound is essential to the invention in its broader aspects. Moreover, since a monomer such as 4-vinylpyridine can be applied directly to the wood with or without a solvent followed by polymerization in situ, not even a polymer itself is required for the initial treating step in applicant's two-step method.

When a polymer is used, however, its solubility in some solvent is necessary to this initial treating step. Accordingly, a polymer must be a homopolymer of linear and/or branched chains, but without cross-linking. As previously discussed, no absolute restrictions on concentration have been found aside from practical considerations such as viscosity, the solubility limit of the polymer in the solvent, the desired amount of treatment, and the like. With applicant's preferred polymer, a concentration up to about 10% poly-4-vinylpyridine in methanol has been preferred.

The next step in applicant's two-step procedure is treating the wood a second time with a copper ion source to thereby produce the polymeric copper complex desired. Copper sulfate and copper chloride have been preferred, although others are also acceptable. No absolute restrictions on concentration have been found, the principal interest being to approach the maximum uptake or capacity of the polymer already contained in the wood. Used thus far has been a concentration up to about 10% copper salt in aqueous solution, although practical factors such as solubility, economy, and desired method of treatment are the ultimate factors to be considered. Moreover, although copper sources have been used by applicant in testing to date, it is understood that other metal ions which exhibit toxicity toward wood-attacking organisms and which effectively complex when combined with pyridine rings are also within the scope and coverage of applicant's invention as defined and claimed herein.

As discussed previously, each of the two treating steps in applicant's method can involve impregnating the wood through soaking, pressure or vacuum means, or superficially applying the polymeric copper complex to the wood through painting, brushing, spraying or the like. It is preferred from testing to date that after each treating step the wood be allowed to dry prior to any further treatment or use.

Applicant's one-step procedure is more preferred under most circumstances if only for the fact that it requires one less step in the application. In particular, it involves a single treating of the wood using a soluble polymeric copper complex which also comprises a polymer with pendant groups containing pyridine rings complexed with the copper ions in solution to effectively inhibit fungi and bacteria growth and the decay they produce. In its most-preferred form, this single treating procedure has involved first preparing a solution of the preferred poly-4-vinylpyridine in water and methanol, or some other suitable co-solvent such as ethylene glycol, pyridine, acetic acid or 1-formylpiperidine, or a mixture thereof. The preferred copper chloride is then added to the polymer solution to form the complex before treating a wood surface with the combined mixture. Although direct addition of the copper salt is possible, it is preferred to first prepare a solution of the salt in water or other suitable solvent before adding. It is also preferred from testing thus far that the combined mixture comprise approximately equivalent amounts of water and the selected co-solvent to assist with maintaining solubility of the complex during application.

The preferred concentration of the polymer in solution is the same as that described previously with regard to applicant's two-step procedure. This is also true of the copper concentration, with the principal concern in selecting a copper salt and its concentration being to preserve the solubility of the resulting polymeric copper complex in the combined co-solvent solution while it is applied to the wood in whatever specific method of treatment is desired. In this regard, the preferred concentration of copper salt in the combined mixture is up to about its stoicheometric equivalence with the polymer in solution. This amount varies, for example, with the selected co-solvent used with the water, i.e., up to a stoicheometric amount of copper was added with pyridine or acetic acid as the co-solvent whereas about 20–30% of a stoicheometric equivalent was used with methanol, ethylene glycol, and 1-formylpiperidine. It has also been shown that agitation fosters the continued solubility of the polymeric copper complex during adding and subsequently treating the wood.

An alternate embodiment of applicant's preferred one-step and two-step methods of treatment as described above has been to cross-link the homopolymer form of the polymer subsequent to its application to the wood. This can be accomplished through standard radiation techniques, although preferred has been the use of chemical cross-linking agents such as 1,4-dibromobutane which is introduced with the polymer solution. Conventional heating over time pursuant to standard procedures then results in the desired cross-linked polymeric structure. This cross-linking is possible before or after treating the wood with the copper salt solution in the two-step process described above. In addition, it is possible to apply a monomer such as 2- or 4-vinylpyridine, either neat or in solution, to the wood and then to polymerize and cross-link this monomer with an agent such as divinylbenzene in a single step using the above technique. It is also possible to perform a radical-induced graft polymerization in which, for example, the 2- or 4-vinylpyridine monomer is grafted directly to cellulose fibers in the wood to form polymer chains. These procedures are not preferred at least from experiments performed to date.

In another alternate form, applicant has found that an insecticide or other like substance can be applied in the same treating step in which his preferred polymer solution is applied to the wood or in a subsequent application. In an example given below the insecticide "Lindane" marketed by E. I. DuPont de Nemours & Co., Inc. of Wilmington, Del. was used effectively in this manner.

Reference will now be made to the following specific examples and tables which particularly point out and describe specific embodiments of applicant's invention as well as other examples using prior art compounds in an effort to better understand the nature and scope of applicant's discovery. The method of treatment used in these examples was soaking the wood articles over extended periods of time in the various solutions. This is in no way restrictive or limiting, however, it being understood that applicant's discovery is equally suited for use in other conventional methods of impregnation and more superficial applications such as those previously described.

EXAMPLES 1–21

Sample preparations were made and wood samples (tongue depressors) were treated in groups of three according to the procedures set forth below:

Examples 1–3: Three wood samples were first soaked for 18 hours at room temperature in a 10% methanolic solution of poly-4-vinylpyridine. After removal from the methanolic solution, the samples were dried and soaked for another 18 hours at room temperature in a 10% aqueous solution of copper chloride. Excess copper solution was rinsed from the samples prior to their being dried and tested in the manner described below.

Examples 4–6: The procedure described above for Examples 1–3 was repeated using a 10% methanolic solution of a copolymer of 4-vinylpyridine and styrene in a ratio of 90:10 instead of the poly-4-vinylpyridine solution. Observations were made and the results obtained are described below.

Examples 7–9: Three wood samples were allowed to soak for 16 hours at 5° C. in a solution containing 300 g of 4-vinylpyridine, 2.5 g of VAZO 33, and 8 g of divinylbenzene (55%). VAZO 33 is a trademark used to identify a low-temperature azo compound known to generate free radicals for polymerization, the compound being marketed by the E. I. DuPont de Nemours & Co., Inc., Wilmington, Del. It has a chemical name of 2,2'-asobis-(2,4-dimethyl-4-methoxyvaleronitrile). The samples were blotted dry and maintained at 35°–40° C. for 12 hours in an atmosphere of 4-vinylpyridine to effect polymerization and cross-linking. The samples were then soaked in a 10% aqueous copper chloride solution as described above, and the results of their examination are given below.

Examples 10–12: Three wood samples were soaked for 18 hours at 5° C. in a solution containing 30 g of poly-4-vinylpyridine, 3 g of 1,4-dibromobutane, and 267 g of methanol. The samples were blotted dry and maintained at 80° C. for 16 hours to effect cross-linking. The samples were then soaked for 18 hours in a 10% copper chloride solution as described above and the results of their examination are given below.

Examples 13–15: The procedure described for Examples 7–9 above was repeated, but without the addition of divinylbenzene to the solution containing 4-vinylpyridine and VAZO 33. A graft polymer resulted between the 4-vinylpyridine and the cellulose fibers in the wood. The samples were examined and the results are given below.

Examples 16–18: Three wood samples were soaked for 18 hours at room temperature in a 10% aqueous copper chloride solution. Excess copper solution was rinsed from the samples prior to drying and their further examination in connection with the table below.

Examples 19–21: Three wood samples were dried to a constant weight and used in the following examination as control samples without further treatment.

The several wood samples prepared and treated according to the descriptions above were next placed in moist soil containing rotting wood and were maintained in a moist condition at 25°–28° C. Approximately one-half of each wood sample was placed below the soil surface. After 70 days the wood samples were removed and excess soil washed from their surfaces. Deterioration was first visually observed, with the result that samples corresponding to Examples 1–15 which had been treated according to some embodiment of applicant's invention showed little or no surface discoloration whereas the samples corresponding to Examples 16–21 showed visible signs of discoloration and decay. Deterioration was then quantitatively determined as a percent loss of sample weight through measurements taken before and after the soil incubation period. These results are summarized in Table I below.

TABLE

| Example No. | Sample Weight (i) | Polymer Uptake | Copper Uptake | Sample Weight (t) | Sample Weight (f) | Weight Change | % Weight Loss |
|---|---|---|---|---|---|---|---|
| 1 | 3.428 g | 0.121 g | 0.020 g | 3.569 g | 3.395 g | 0.174 g | 4.9% |
| 2 | 3.282 | 0.159 | 0.040 | 3.481 | 3.304 | 0.177 | 5.1 |
| 3 | 3.382 | 0.145 | 0.017 | 3.544 | 3.406 | 0.138 | 3.9 |
| 4 | 3.211 | 0.121 | 0.023 | 3.355 | 3.168 | 0.187 | 5.6 |
| 5 | 3.198 | 0.187 | 0.019 | 3.404 | 3.210 | 0.194 | 5.7 |
| 6 | 3.387 | 0.192 | 0.026 | 3.605 | 3.408 | 0.197 | 5.5 |
| 7 | 3.253 | 0.105 | 0.018 | 3.376 | 3.266 | 0.110 | 3.3 |
| 8 | 3.174 | 0.127 | 0.022 | 3.323 | 3.197 | 0.126 | 3.8 |

TABLE -continued

| Example No. | Sample Weight (i) | Polymer Uptake | Copper Uptake | Sample Weight (t) | Sample Weight (f) | Weight Change | % Weight Loss |
|---|---|---|---|---|---|---|---|
| 9 | 3.098 | 0.121 | 0.027 | 3.246 | 3.127 | 0.119 | 3.6 |
| 10 | 3.208 | 0.139 | 0.025 | 3.372 | 3.229 | 0.143 | 4.2 |
| 11 | 3.251 | 0.142 | 0.038 | 3.431 | 3.280 | 0.151 | 4.4 |
| 12 | 3.411 | 0.131 | 0.035 | 3.577 | 3.404 | 0.173 | 4.8 |
| 13 | 3.169 | 0.116 | 0.020 | 3.305 | 3.148 | 0.157 | 4.9 |
| 14 | 3.341 | 0.123 | 0.025 | 3.489 | 3.328 | 0.161 | 4.6 |
| 15 | 3.302 | 0.118 | 0.022 | 3.442 | 3.299 | 0.143 | 4.2 |
| 16 | 3.111 | — | 0.008 | 3.119 | 2.467 | 0.652 | 20.9 |
| 17 | 3.260 | — | 0.011 | 3.271 | 2.568 | 0.703 | 21.5 |
| 18 | 2.447 | — | 0.005 | 3.452 | 2.770 | 0.682 | 19.8 |
| 19 | 3.105 | — | — | — | 1.803 | 1.302 | 41.9 |
| 20 | 3.185 | — | — | — | 1.948 | 1.237 | 38.8 |
| 21 | 3.304 | — | — | — | 2.183 | 1.121 | 33.9 |

(i) — initial weight
(t) — weight after treatment
(f) — weight after deterioration study

EXAMPLE 22

A solution was first prepared containing 243 g of water, 243 g of methanol, and 15 g of poly-4-vinylpyridine. A second solution containing 1.7 g of copper chloride and 10 ml of water was then prepared and added to the polymer solution with good agitation. Three wood articles (tongue depressors) were soaked in this combined aqueous methanolic solution for 16 hours, blotted dry, and dried to a constant weight. When the samples were subjected to the deterioration conditions described above for Examples 1-21 for a period of 75 days, subsequent examination showed the percent weight loss varied between 3.7-4.3%. This was significantly better than untreated samples or samples treated only with a copper solution as appear in Table 1. These results achieved with applicant's one-step treatment were also at least equivalent to the results achieved with applicant's two-step embodiment as also summarized in Table I.

EXAMPLE 23

3 g of "Lindane" were added to 300 ml of a 1% methanolic solution of poly-4-vinylpyridine. Three wood articles (tongue depressors) were immersed in this solution. After refluxing the solution for 8 hours, the samples were removed, dried, and soaked for an additional 18 hours in a 1% aqueous solution of copper sulfate. Wood samples treated in this manner resisted attack by microbes and insects including ants and termites in subsequent laboratory testing.

EXAMPLES 24-29

Examples 24-26: Three wood samples were soaked for 18 hours in a 60/40 creosote/coal tar solution. The excess solution was wiped off and the samples were dried at room temperature for 72 hours. The samples were then tested as described in Examples 1-21 above, and the results are tabulated below.

Examples 27-29: Three wood samples were soaked for 18 hours in a 4.25% solution of pentachlorophenol in a petroleum solvent. The excess solvent was wiped off and the samples were dried at room temperature for 72 hours. The samples were tested according to procedures in Examples 1-21 above, and the results are tabulated below.

TABLE II

| Example No. | Sample Weight (i) | Preservative Uptake | Sample Weight (t) | Sample Weight (f) | Weight Change | % Weight Loss |
|---|---|---|---|---|---|---|
| 24 | 3.262 g | 0.980* | 4.242 g | 4.030 g | 0.212 g | 5.0% |
| 25 | 3.315 | 0.821* | 4.136 | 3.942 | 0.194 | 4.7 |
| 26 | 3.338 | 0.917* | 4.255 | 4.038 | 0.217 | 5.1 |
| 27 | 3.092 | 0.221** | 3.313 | 3.111 | 0.202 | 6.1 |
| 28 | 3.293 | 0.257** | 3.550 | 3.397 | 0.153 | 4.3 |
| 29 | 3.298 | 0.267** | 3.565 | 3.344 | 0.221 | 6.2 |

*creosote/coal tar (60/40)
**4.25% solution of pentachlorophenol

Comparison of the results for these prior art preservatives tabulated above with the results of testing of applicant's preferred polymeric copper complex as seen in Table I, demonstrates that applicant's preferred treatment is at least as good or better than pentachlorophenol and the creosote/coal tar compounds in preserving wood from decay in these test procedures.

EXAMPLE 30

A solution containing 300 g of water, 300 g of ethylene glycol and 3 g of poly-4-vinylpyridine was prepared. 75 g of a 1% solution of copper chloride in water was added to the polymer solution with good agitation. Three wood samples (tongue depressors) were soaked in the solution for 16 hours, blotted dry and dried to a constant weight. The samples were subjected to the deterioration conditions described above for 75 days. The percent weight loss varied between 3% and 6%.

EXAMPLE 31

The procedure of Example 30 was repeated using 300 g of water, 300 g of 1-formylpiperidine as the polymer co-solvent. Upon subsequent deterioration testing, similar results were obtained.

EXAMPLE 32

The procedure of Example 30 was repeated using 300 g of water, 300 g of pyridine as the polymer co-solvent. 300 g of a 1% solution of copper chloride in water was added to the polymer solution, and upon subsequent deterioration testing, similar results were obtained.

EXAMPLE 33

48 g of poly-4-vinylpyridine which had been partially quaternized (30%) using standard procedures was dissolved in 400 ml of water. With stirring, a solution containing 3.7 g of copper chloride in 100 ml of water was added. The resulting solution was used to treat three wood articles (tongue depressors) according to the procedure in Example 22 above, and the samples were found effective in preventing microbial degradation of the wood when subjected to deterioration conditions described above for 75 days.

EXAMPLE 34

300 g of a 1.25% aqueous solution of copper chloride was added with stirring to a solution containing 3 g of poly-4-vinylpyridine in 300 g of glacial acetic acid with good agitation. Three wood samples (tongue depressors) were soaked in the solution for 18 hours, blotted of excess solution and dried to a constant weight. The samples were subjected to the deterioration conditions described above for 75 days. No physical signs of deterioration were observed and the percent weight loss varied between 3% and 6%.

EXAMPLE 35

The procedure of Example 34 was repeated using 3 g of poly-2-vinylpyridine as the polymer. Upon subsequent deterioration testing, no physical signs of deterioration were observed and the percent weight loss was similar to slightly higher than in Example 34.

EXAMPLE 36

The procedure of Example 34 was repeated using 3 g of poly-2-methyl-5-vinylpyridine as the polymer. The initially formed sticky precipitate gradually dissolved to give a clear green solution. Upon subsequent deterioration testing, no physical signs of deterioration were observed and the percent weight loss was similar to slightly higher than in Example 34.

EXAMPLE 37

A dialkylated pyridine, 3-[(N-methyl-N-4-pyridyl)amino]-propionic acid was attached to a laurylated poly(ethylenimine) as described by M. A. Hierl, E. P. Gamson, and I. M. Klotz, *J. Am. Chem. Soc.*, 101, 6020 (1979). The polymer (1 g) was added with stirring to a solution containing 50 g of glacial acetic acid and 50 g of water. The solution was stirred for 6 hours at room temperature and filtered. Wood samples (tongue depressors) were soaked in the filtrate for 18 hours, blotted of excess solution, and dried. The samples were then soaked for 18 hours in a 10% aqueous copper sulfate solution. The samples were blotted of excess solution and dried to a constant weight. The wood samples treated in this manner resisted microbial attack in subsequent laboratory testing.

I claim:

1. A method for preserving wood, comprising the step of treating the wood with a polymer with pendant groups containing pyridine rings complexed with copper.

2. The method in claim 1 in which said treating includes the steps of:
   (a) treating the wood with the uncomplexed polymer; and
   (b) treating the wood with a copper ion source.

3. The method in claim 2 in which said polymer treating step is with a solution of the uncomplexed polymer and said copper treating step is with a solution of a copper salt.

4. The method in claim 3 in which said treating steps are followed by drying the wood prior to further treatment or use.

5. The method in claim 3 comprising the additional step of cross-linking the polymer in situ in the wood.

6. The method in claim 3 in which said treating steps comprise impregnating the wood with the respective solutions by means of pressure, vacuum or soaking.

7. The method in claim 3 in which said treating steps comprise applying the respective solutions to the wood by means of brushing, spraying or dipping.

8. The method in claim 3 in which said polymer treating step precedes said copper salt treating step.

9. The method in claim 8 comprising the additional step of treating the wood with an insecticide during or subsequent to said polymer and said copper salt treating steps.

10. The method in claim 8 in which the concentration of the polymer in said treating solution is up to about 10%.

11. The method in claim 10 in which said polymer treating step is with a solution of poly-4-vinylpyridine, poly-2-vinylpyridine or poly-2-methyl-5-vinylpyridine.

12. The method in claim 10 in which said polymer treating step is with a solution of poly-4-vinylpyridine.

13. The method in claim 10 in which said polymer treating step is with a solution of a copolymer including 4-vinylpyridine monomer.

14. The method in claim 10 in which said polymer treating step is with a solution of poly-4-vinylpyridine in methanol and said copper salt treating step is with an aqueous solution of copper sulfate.

15. The method in claim 1 in which said treating step is with a soluble polymeric copper complex in solution.

16. The method in claim 15 comprising the additional steps of:
   (a) preparing a solution of the uncomplexed polymer in water and a co-solvent; and
   (b) adding a copper ion source to said prepared polymer solution to produce the soluble polymeric copper complex in solution for said treating step.

17. The method in claim 16 in which said adding includes the steps of:
   (a) preparing a solution of a copper salt; and
   (b) combining said prepared polymer and copper salt solutions.

18. The method in claim 17 comprising the additional step of cross-linking the soluble polymeric copper complex in situ in the wood after said treating.

19. The method in claim 17 in which the concentration of the copper salt in said combined solution is up to about a stoicheometric equivalence with the polymer concentration in solution.

20. The method in claim 19 in which the concentration of the polymer in said combined solution is up to about 10%.

21. The method in claim 20 in which said combined solution comprises approximately equivalent amounts of water and a co-solvent to form the solution.

22. The method in claim 21 in which said combining includes agitating said combined solution to maintain the soluble polymeric copper complex in solution for said treating.

23. The method in claim 21 in which said prepared polymer solution is of poly-4-vinylpyridine, poly-2-vinylpyridine or poly-2-methyl-5-vinylpyridine.

24. The method in claim 21 in which the co-solvent in said prepared polymer solution is methanol, ethylene glycol, pyridine, acetic acid or 1-forymylpiperidine, or a mixture thereof.

25. The method in claim 21 in which said prepared polymer solution is of poly-4-vinylpyridine.

26. The method in claim 21 in which said prepared polymer solution is of poly-4-vinylpyridine in water and acetic acid and said prepared copper salt solution is of copper chloride in water.

27. The method of claim 21 in which said treating is followed by drying the wood prior to use.

28. The method of claim 21 comprising the additional step of treating the wood with an insecticide during or subsequent to said treating with the soluble polymeric copper complex.

29. The method in claim 1 in which said treating includes the steps of:
   (a) treating the wood with the uncomplexed monomer precursor of the polymer; and
   (b) treating the wood with a copper ion source.

30. The method in claim 29 comprising the additional step of polymerizing the monomer precursor in situ in the wood.

31. The method in claim 30 in which said monomer treating step is with a solution of the uncomplexed monomer precursor and said copper treating step is with a solution of a copper salt.

32. The method in claim 31 in which said polymerizing includes the step of cross-linking the monomer precursor in situ in the wood.

33. The method in claim 31 in which said monomer treating step precedes said copper salt treating step.

34. The method in claim 33 in which said polymerizing precedes said copper salt treating step.

35. The method in claim 34 in which said monomer treating step is with a solution of 4-vinylpyridine, 2-vinylpyridine or 2-methyl-5-vinylpyridine.

36. The method in claim 34 in which said monomer treating step is with a solution of 4-vinylpyridine.

37. The method in claim 34 in which said monomer treating step is with a solution of 4-vinylpyridine in methanol and said copper salt treating step is with an aqueous solution of copper sulfate.

38. An article of wood treated with a polymer with pendant groups containing pyridine rings complexed with copper for preservation purposes.

39. The article in claim 38 in which the polymer is cross-linked.

40. The article in claim 38 in which the polymer is a homopolymer.

41. The article in claim 38 in which the polymer complexed with copper is poly-4-vinylpyridine, poly-2-vinylpyridine or poly-2-methyl-5-vinylpyridine.

42. The article in claim 38 in which the polymer complexed with copper is poly-4-vinylpyridine.

43. The article in claim 38 in which the polymer complexed with copper is a copolymer including a 4-vinylpyridine monomer.

44. The article in claim 38 impregnated with the polymeric copper complex by means of pressure, vacuum or soaking.

45. The article in claim 38 treated with the polymeric copper complex by means of brushing, spraying or dipping.

* * * * *